United States Patent [19]
Harwood et al.

[11] 3,904,775

[45] Sept. 9, 1975

[54] PROCESS FOR PRODUCTION OF A SIMULATED MEAT PRODUCT

[75] Inventors: Charles C. Harwood, Elgin; George M. Smith, Jr., Crystal Lake, both of Ill.

[73] Assignee: The Quaker Oats Company, Barrington, Ill.

[22] Filed: Aug. 22, 1973

[21] Appl. No.: 390,365

[52] U.S. Cl. ............... 426/641; 426/647; 426/601; 426/611; 426/608; 426/447; 426/656; 426/657; 426/802
[51] Int. Cl.²............................................ A23J 3/00
[58] Field of Search ........... 426/351, 447, 364, 362, 426/802

[56] References Cited
UNITED STATES PATENTS

| | | | |
|---|---|---|---|
| 3,142,571 | 7/1964 | McAnelly | 99/14 |
| 3,440,054 | 4/1969 | Sair | 99/14 |
| 3,537,859 | 11/1970 | Hamdy | 99/17 |

*Primary Examiner*—James R. Hoffman
*Attorney, Agent, or Firm*—Donnie Rudd

[57] ABSTRACT

A process is disclosed for preparing a puffed food product simulating meat or the like. The process comprises admixing a proteinaceous material with specified amounts of water, subjecting the mixture to conditions sufficient to convert it to a flowable substance, extruding the mixture by forming it into an annular or cylindrical shape and cooling both the inside and outside of the cylinder with the extrusion not causing puffing of the product, placing the extrudate in a confined space, subjecting the extrudate to water boiling temperatures and superatmospheric pressure, and suddenly releasing the pressure on the extrudate to cause it to puff and resemble simulated meat or the like.

8 Claims, No Drawings

PROCESS FOR PRODUCTION OF A SIMULATED MEAT PRODUCT

BACKGROUND OF THE INVENTION

1. Field of the Invention:

This invention relates to a simulated meat product produced from concentrated proteinaceous materials.

2. Description of the Prior Art:

Many attempts have been made to produce simulated meat products from relatively inexpensive protein sources. Perhaps the most successful of these processes has been the so called spun protein which utilizes small strands of protein bound together by a binder to simulate meat. There have also been many attempts to produce puffed protein material. Among the best of these is that disclosed in U.S. Pat. No. 3,440,054 to Louis Sair. This expanded product, however, cannot be as rapidly produced as may be commercially desirable, and, while it is a great step forward in simulating meat, it still does not have all the attributes of natural meat. Thus far, no one has produced a simulated meat product which has the taste, and particularly the texture characteristics, of natural meat. The unique embodiment of the process of this invention makes possible a simulated meat product high in protein and having essentially the same texture characteristics of natural meat.

SUMMARY OF THE INVENTION

It is an object of this invention to provide a process for preparing a puffed food product simulating meat or the like and having the texture characteristics of meat.

It is another object of this invention to provide a process for utilizing relatively inexpensive proteinaceous materials to prepare a simulated meat product.

The objects of this invention are accomplished in a process for preparing puffed food products simulating meat, said process comprising:

a. admixing a proteinaceous mixture having protein concentrations of at least about 30 percent by weight with water in an amount sufficient to provide a final moisture content of from about 15 percent to about 40 percent by weight;

b. subjecting the moistened proteinaceous mixture to conditions sufficient to convert it into a flowable substance, said conditions being either increased shear, elevated pressure, or elevated temperature;

c. extruding the flowable substance in a uniform linear flow in an issued extrudate state into a medium of lower pressure in a condition whereat it does not simultaneously puff;

d. placing the extrudate in a confined space;

e. subjecting the extrudate to water boiling temperatures and superatmospheric pressure; and f. suddenly releasing the pressure on the extrudate to cause it to puff and resemble simulated meat or the like; the improvement in the extruding of the flowable substance in a uniform linear flow in an extrudate state comprising: maintaining the mixture in a plastic condition, forming the mixture into an annular or cylindrical shape, cooling both the interior and exterior of the annular or cylindrical form, extruding the cooled, flowable substance in a cylindrical shape, and thereafter subdividing the cooled cylinder.

The objects of this invention are further accomplished by the preferred embodiment wherein the proteinaceous material has added thereto from about ½ percent to about 3 percent by weight of an edible oil prior to subjection of the proteinaceous material to conditions sufficient to convert it to a flowable substance.

The objects of this invention are further accomplished in the embodiment wherein added to the proteinaceous mixture is a member selected from the group vegetable oil, coconut oil, animal oil or fat, oil bearing cereals, oil bearing grains, mineral oil, food grade stearates, and polylactic acid esters of fatty acid.

The objects of this invention are also accomplished by the above embodiments wherein the proteinaceous material comprises a member selected from the group oil seed vegetable protein, casein, caseinate salt, gelatin, microbiological protein, egg white, muscle protein, keratins, lactalbumen and blood and in particular wherein the oil seed vegetable protein is a member selected from the group soy flour, soy protein, soy protein concentrates and soy protein isolates. It is of particular advantage in this invention wherein the proteinaceous material has the pH adjusted to from 4.5 to 10.5 prior to addition to water.

The process of this invention requires the utilization of a proteinaceous mixture of a protein material comprising a member selected from the group oil seed vegetable proteins, casein, caseinate salts, gelatin, microbiological protein, egg white, muscle protein, keratins, lactalbumen and blood, having a protein concentration of at least 30 percent by weight. The protein concentration must be at least about 30 percent in order to provide a protein content sufficient to supply the dietary needs of a person consuming the product in lieu of meat or as a partial substitute therefor. The protein material of this invention can be gelatin, microbiological protein, such as yeast and single cell protein, egg white, muscle protein, keratins, such as hoofs, hair, and feathers, lactalbumen and blood, either whole or as blood meal. The preferred embodiment, however, of this invention is one in which the proteinaceous material is soy flour, soy protein, soy protein concentrate, or soy protein isolate.

The first step in this process requires the admixing of the proteinaceous mixture of protein material with an amount of water sufficient to provide a final moisture content of from about 15 percent to about 40 percent by weight. The moisture can be readily adjusted within this range by one skilled in the art, but must be maintained within the range if the latter puffing is to produce a simulated meat product.

The first step of this process also preferably includes mixing of from about ½ percent to about 3 percent by weight of an edible oil with the proteinaceous mixture of protein material prior to subjecting it to the next step of elevation of pressure and temperature, or other such conditions which would convert it into a flowable substance. The edible oil can include any residual fat in the protein material. The edible oil can be any edible oil although it is strongly preferred to use a vegetable oil such as corn oil, etc. or coconut oil. In other words, the oil can be an animal oil or fat or a vegetable oil or mineral oil. In these cases, the edible oil is added in an amount of from about ½ percent by weight to about 3 percent by weight. The added oil can also be in the form of an oil bearing cereal product or oil bearing grain. In these cases, sufficient cereal product or grain must be added to bring the overall added oil content to from about ½ percent to about 3 percent by weight. In other words, if the cereal product contains 50 percent by weight edible oil, it should be added in an amount of from about 1 percent by weight to about 6 percent by weight to give the proper quantity of added edible oil. The added edible oil can also be in the form of an oil bearing animal product which also would be added in an amount sufficient to give an overall added oil content of from about ½ percent by weight to about 3 percent by weight. Thus, the added edible oil includes but is not restricted to such things as oat flour, partially defatted soybean flour, full fat soybean flour, wheat germ, corn oil, vegetable oil, lard, corn germ, and edible mineral oils. It may also include such things as fatty acids produced from edible oil or fat. Examples of useful materials are the well known food grade stearates or polylactic acid esters of fatty acids, e.g. sodium stearoyl-2-lactylate. If the amount of oil goes below about one-half percent by weight, then the improvements are not significantly realized. Thus, it is preferred to maintain a certain amount of oil or fat in the product. If the amount of oil goes above about 3 percent by weight then the product begins to crumble and does not have the texture and appearance of meat. The added oil increases production rates and minimizes heat and pressure exposure which lead to degradation of the product. The next step in this process requires subjecting the moistened oil containing proteinaceous material to conditions sufficient to convert it to a flowable substance. This may be accomplished by many known methods including the use of the common macaroni or spaghetti type production apparatus. The conditions sufficient to convert the material to a flowable substance can be a combination of methods. It can be increased shear such as that found in a common cereal extruder, or it can encompass the addition to, or as an inclusion with the increased shear, or as a substitute therefor, either elevated pressure or elevated temperatures. Any combination of increased shear, elevated pressure or elevated temperatures can be used so long as the material is converted into a flowable substance. This flowable plastic condition is necessary in order to obtain the desired texture characteristics later on in the product. The particular combination of shear, pressure and temperature can be readily determined by one skilled in the art of cereal extrusion.

The next step in this process requires extruding the flowable substance in a linear flow in an issued extrudate state into a medium of lower pressure in a condition whereat it does not simultaneously puff. In other words, this step requires passing the moistened proteinaceous material which has been subjected to an elevated pressure and temperature into a lower pressure range without puffing it. By use herein of the term "puffing" at this point in the process, it is simply meant expansion or that expansion must be prevented. This consequently produces a glassy or glass-like surface on the outer portion of the extrudate as well as the inner surface of the extrudate in the cylindrical or annular cavity. This extrudate has a translucent to glassy appearance and a laminar structure. It is of the heart of this invention that in this extrusion step the material must be formed into an annular or cylindrical shape while still in the plastic condition. In such case, heating may be necessary or mere maintenance of the temperature may be necessary in order that the material maintain its plastic condition before being shaped into the annular or cylindrical shape. By use of the terms "annular" or "cylindrical" shape, I intend to refer to a generally circular extrusion cavity which has both an interior and exterior portion. In other words, a ring shaped cross section or some circular type cross section which forms a cylindrical shape upon elongation. In other words, the desired shape is one which is hollow on the inside. Of commercial necessity, the cross section of the cylinder is almost always circular or annular. In this extrusion step, after the product is formed into the cylindrical shape while in a plastic condition, both the interior and exterior of the annular or cylindrical form are cooled. After substantial cooling down below the point at which puffing would occur upon exposure to atmospheric pressure, the substance is extruded while still in the cylindrical shape, and the extruded product is thereafter subdivided into smaller particles. The size of the particle is not important but must be such as to give the final shape of the simulated meat. We prefer, for instance, that small cylindrical pieces of about one-sixteenth inch diameter be produced.

The next step in this process is preferred although not absolutely necessary, and comprises reducing partially the moisture of the issued extrudate without puffing (expanding) it. This can be accomplished by any of the known drying methods such as a hot air stream or a conventional or microwave oven. The critical design feature of this step of our invention, when it is used, however, is that the extrudate must be partially dried without causing puffing (expansion).

The next steps in our process require placing the extrudate in a confined space, subjecting the extrudate in the confined space to a water boiling temperature (i.e. at least 212°F.) for a time and pressure sufficient to cause puffing upon release of the pressure. We generally prefer that this time be from 15 to 75 seconds and that the pressure be from 150 psi to 250 psi. One skilled in the art can readily decide what pressure and time exposure is necessary in order to give him the simulated meat product that he desires.

Finally, the pressure is suddenly released on the extrudate causing the extrudate to puff (expand) and resemble simulated meat or the like. This pressure releasing step can be accomplished merely by opening the confined space wherein the extrudate has been confined at a higher pressure. When the extrudate is puffed, it can be dried somewhat or merely left to dry from its own heat retention, thus forming a simulated meat product. The product of this invention bears a particularly close resemblance to chicken meat having an exterior skin portion and a fiberous inner portion very much like cooked chicken meat.

The structured or textured puffed product has good texture, water absorption or retention properties, and firmness in the essentially dry state and in water at room temperature and boiling water, and when retorted. The terms "textured" or "structured" hereinafter refer to puffed proteinaceous products which when hydrated have the feel, firmness, structure, texture, or bite qualities similar to the natural food product, for example, such as fish, poultry products and the like and puffed food products which are pleasing in the mouth of humans.

The proteinaceous materials which may be used in this process include the afore-mentioned proteinaceous materials having a protein content of at least about 30 percent or preferably a protein content of at least about 70 percent by weight. If desired, such protein materials may be treated (e.g. with acids, acid salts, alkali metals or alkali earth metal hydroxides) so that the pH falls within the range of about 4.5 to 10.5. Preferably the pH of the proteinaceous material should be from about 5.5 to about 8.5.

As the pH of the proteinaceous material is lowered, there is a tendency for the puffed product to be somewhat tougher or have somewhat less of an ability to absorb or retain water. Therefore, it is important to adjust the pH to give the proper texture of the product and one skilled in the art can readily determine what pH he need use depending upon what texture he desires.

When one wishes to produce a bland, proteinaceous product which for many purposes is preferred, the proteinaceous material should be substantially or sufficiently pure and have a high protein content. If one wishes to produce a puffed proteinaceous food product, which need not be completely bland, one may use proteinaceous materials of a lower protein content.

If desired, the proteinaceous material may include for some purposes, a desired edible amount (e.g. preferably less than 50 percent by weight) of a suitable cereal, starch, sugar, coloring material, seasoning or flavoring ingredient, or the like. These materials may be present in or blended with the proteinaceous material before elevated pressure is applied. One may use, for example, wheat flour, corn starch, yellow corn flour, cane sugar, dextrose, and the like.

Furthermore, it has been found desirable to include an edible form of available calcium (e.g. calcium ions) in or with the proteinaceous material at the time that the material is subjected to elevated pressure for purposes of imparting a sturdier structure, (e.g. a skeleton like structure) to the puffed textured proteinaceous product so that the puffed product has a higher degree of firmness or chewiness when that product is in an essentially dry state that exists after puffing and when it is subjected to rehydration. Although calcium tends to enhance the rehydrated texture of the puffed product, good or satisfactory rehydrated firmness or chewiness can be obtained without it. The calcium may be incorporated into the proteinaceous material in the form of an edible calcium salt such as dicalcium phosphate dihydrate, calcium chloride or the like without importing an undesired flavor to the puffed proteinaceous product.

The proteinaceous material is in a substantially uniform, moist (e.g. crumbly to free flowing) state and has a controlled effective amount of water when it is subjected to increased shear or other such conditions which convert it into a flowable substance. The moist material must be subjected to such conditions, including either sufficient increased shear, elevated temperature, increased or elevated pressure such that the material is transformed into workable, substantially homogeneous, deformable, flowable, coherent, plastic mass, which forms a moisture containing translucent to glassy product that is not puffed as a result of that treatment and has thermoplastic characteristics. It is preferred that essentially all of the moist, proteinaceous material be transformed into the translucent to glassy product. Furthermore, the translucent to glassy product must retain some of its moisture until the product is later puffed in a separate and distinct operation.

The amount of water and edible oil present in the application of conditions sufficient to convert the material into a flowable substance, the nature of the proteinaceous material, the conditions of temperature, pressure and time, in connection with the compaction operation, the nature of the particular equipment used for preparing, the conditions sufficient to convert into a flowable substance, and the particular characteristics sought (e.g. fine or coarse cells or texture) as a result of the latter separate puffing step are interrelated and should be coordinated. Thus, when one operating condition is varied or selected, that condition in turn can influence the other desired operating conditions.

It has been found, for example, that if too high a temperature is reached or applied during the application of increased shear or other such conditions, then the proteinaceous material has a tendency to discolor or develop an off flavor as a result thereof (characteristics which are undesired when a bland, natural colored, puffed product is sought), even though the latter produced puffed product has better tendency to be firmer in texture when it is rehydrated. It is, therefore, important that too high a temperature not be reached when producing the product. One sufficiently skilled in the art can easily tell at which temperature his particular combination of protein and moisture produces a product which is degraded or off color.

The use of too low a temperature during compaction can prevent one from producing the desired translucent to glassy product or later result in producing a poorly puffed product that is rather soft or mushy. It is, therefore, necessary that one apply shear or other such conditions in a manner which gives the desired texture without exposure to temperature and pressure conditions which degrade the material or cause loss of color and flavor.

The application of increased shear or elevated pressure to the proteinaceous material tends to increase the temperature of that material. When even below water boiling temperatures accompany the application of mechanical pressure or increased shear, such conditions may be sufficient to form the above referred to plastic mass to a translucent to glassy product.

It may be necessary to apply extra heat to the proteinaceous material so as to subject it to water boiling temperatures during or in conjunction with the application of elavated pressure or increased shear for the purpose of forming a plastic mass which is transformed into a translucent to glassy product and in such instance the application of mechanical pressure or increased shear should be conducted in a system (e.g. extruder) that is closed during operation so as to obviate the loss of moisture from the material or system. In order to avoid simultaneously puffing the compacted material, (subjected to a water boiling temperature) when a flowable mass is discharged or ejected from the system into a medium of lower pressure or unconfined zone at atmospheric pressure, it is necessary to cool (e.g. temper) the mass or reduce its temperature to below water boiling temperatures before the material is discharged or ejected from the system.

The controlled amount or concentration of water and edible oil present in or with the proteinaceous material which is subjected to conditions sufficient to convert it to a flowable substance must be sufficient to facilitate converting of that material to a plastic state which forms the translucent to glassy product.

The moisture content of the mixture prior to the elevation of temperature and pressure should be in the range of from 15 to 40 percent by weight.

When calcium is present with or in the proteinaceous material, it may be desirable for some purposes to use a relatively high level of water (e.g. within the range of about 35 to 40 percent by weight) to increase the water absorption or water retention properties of the puffed product when it is rehydrated in water.

A variety of devices may be used to increase shear. One may use, for example, a press, commercial rolls, or pellet mills, or an extruder which subjects the moist, proteinaceous material to sufficient pressure and temperature to form a product of desired size and shape (e.g. sheets, discs, pellets, rods, strings or bars). When an extruder is used, it is essential not to discharge or eject the extrudate under water boiling conditions so that the extrusion does not subject the material to simultaneous puffing (expansion) which normally results from the rapid of sudden release of water vapor from the mass when or as the discharged or ejected extrudate enters a zone of lower pressure. Thus, if pressures or temperatures are developed prior to discharge or ejection of the plastic material through the restricted or extrusion die, nozzle, or orifice which would cause the issued extrudate to rapidly release water and puff, it is critical to reduce the temperature of the plastic mass so that it is not discharged or ejected under water boiling or puffing conditions. It is essential and mandatory in this invention that the temperature of the plastic mass be reduced both interior and exterior of the cylindrical shape. In other words, cooling must occur in both the inside and outside of the plastic mass in the cylindrical shape in order to give similar conditions on both sides of the product. The product, therefore, will be uniform in its laminar flow and have uniform texture throughout the product. The pressure differential across the die nozzle, or orifice thus must not cause the extrudate to puff.

Although a variety of injection molding machines and thermoplastic extrusion and compression molding machines may be used in the forming of the plastic mass, one can advantageously use heatable extruder having a rotating compression or compaction screw within a closed heatable barrel with a controlled, restricted extrusion die, nozzle, or orifice at the front end of the barrel. Of particular importance in this invention is a die covered by an application filed concurrently herewith by Carlson et al., U.S. Ser. No. 390,366. The barrel in conjunction with the compression or compaction screw creates during operation a closed chamber which prevents the release of existing water vapor from the material and system. The rotating screw builds up sufficient pressure to cause the plastic mass to be pushed at the desired temperature and pressure into the extrusion head. The extrusion head takes the plastic material and maintains it in a plastic condition for extrusion. It is at this point that the material is formed into an annular or cylindrical shape. Upon formation into the annular or cylindrical shape, the product is then cooled on both the inside and exterior of the annular shape. After cooling, the product exits in the form of a round or cylindrical cooled extrudate and is cut or subdivided into fine parts for further use in the invention. It is critical that the compressed, flowable material must be discharged or ejected from the extruder under water boiling or puffing conditions for the reasons explained above. Therefore, it may be necessary to reduce the temperature of the plastic mass to a large degree depending upon the temperature of the operation. The temperature of the plastic mass may be reduced somewhat in the extruder for example by using an extruder having an elongated nozzle or extension prior to the extrusion die. The plastic mass or flowable substance must be extruded or issued in a uniform linear flow in an issued extrudate state. The die that is used in forming the annular or cylindrical cavity must be such as to mandate the product being in the plastic condition when extruded in the glassy condition. The product is then subdivided and passed on to later steps of the process.

In the event one wishes to produce a puffed product having a relatively coarse texture, relatively large cells, and which has more of a tendency to become soft when rehydrated, which properties may be acceptable for making snacks, then the translucent to glassy product may be puffed in a separate and distinct operation without first being partially dried.

The grain or cell structure of the textured product is related to the puffing conditions and the moisture content of the translucent to glassy product. Since such textured food products will simulate or be used in or with a wide variety of foods, it is difficult to single out the best operating conditions. Generally, it has been found that finer cells result from the puffing operation when the translucent to glassy product to be puffed has a relatively low moisture content. The moisture content of the translucent to glassy product can be reduced to the desired moisture level (e.g. from about 10 percent to about 25 percent by weight) by convention means (e.g. air drying). One may partly dry the moisture containing translucent to glassy material, for example, with air at room temperature, or hot circulating air at a temperature within the range of from about 70°F. to 350°F. and preferably within the range of from about 130°F. to 250°F. Lower temperatures are preferred, however, to prevent undesirable flavor and color changes.

The translucent to glassy product, regardless of whether or not it has been partially dried, has a continuous structure that resists the rapid release of moisture therefrom at elevated temperatures but under water boiling puffing conditions allows for the build-up of pressure in the product from which when rapidly or suddenly released on the product under water boiling or puffing conditions (e.g. at water boiling temperatures) causes the product to puff or be texturized.

The puffing step involves subjecting the moisture containing translucent to glassy product (regardless of whether or not it has been partially dried) to water boiling conditions sufficient to cause puffing of the material upon release of pressure. Preferably the water boiling conditions are maintained for from 15 to 75 seconds and a pressure of from 150 psi to 250 psi is exerted to keep from flashing the water. The product is then suddenly (e.g. instantaneously) released of its pressure and caused to puff. The puffing operation expands the product (e.g. about two to ten fold or more in volume as compared with the volume of the translucent to glassy product as it exits prior to puffing) and produces an expanded, structured, textured, porous product having cells formed by the sudden release of moisture. It is desirable to conduct the puffing step under conditions (e.g. moisture, time, and temperature conditions) which obviate the development of undesired taste or flavor or discoloration. Furthermore, the puffing step should be conducted under conditions which cause substantially all of the translucent to glassy product to puff substantially uniformly.

One may, if desired, dry the puffed product to a desired residual moisture content. The puffed product on contact with water has good stability, is chewy, resists disintegration, and does not become soft and mushy. In addition, the puffed product can have a high bulk specific volume (e.g. at least about 4 cc's per gram). The puffed product on contact with boiling water has a texture of natural meat and in particular, poultry meat.

DESCRIPTION OF THE PREFERRED EMBODIMENTS

The following examples are provided in order to more fully define and explain our invention.

EXAMPLE 1

100 parts by weight of defatted soy flour having a pH of about 7 and a moisture content of from 4 to 5 percent was admixed with 2 parts by weight corn oil and 2 parts by weight dicalcium phosphate dihydrate and 50 parts by weight water. The final mixture had a moisture content of about 37 percent by weight and a pH of about 7. The product was extruded in a cereal extruder with the extruder having a barrel heated to a temperature of about 140°C. The product after leaving the extruder went to an extrusion die and was formed into an annular cavity while heat was applied to both the interior and exterior of the annular cavity to maintain the material in a plastic condition. The product was then cooled to below water-boiling temperature, ie. to about 200°F., by circulating cooling water on both the interior and exterior of the cylinder. As the product exited from the extruder, it was in the form of a round or cylindrical shaped pipe and was cut in the form of a ribbon about one-half inch wide and about one-eighth inch high. The product was then further subdivided in the form of pieces of ribbon.

The partially dried glassy extrudate was then air dried to a moisture content of about 15 percent by weight. It was then placed in a puffing gun of the type described in U.S. Pat. No. 1,878,782 and live steam was injected therein at about 395°F. and about 220 psi pressure for about 25 seconds. The puffing gun was suddenly opened to release the pressure and cause the product to puff. The puffed product was rehydrated by placing it in water and was found to closely resemble the texture of natural chicken meat.

EXAMPLE 2

Example 1 was repeated except coconut oil was added in place of the corn oil. Once again, the flavor of the product was excellent and the product resembled meat in texture and appearance.

EXAMPLE 3

Example 1 was repeated with the exception that soy flour was replaced by soy protein isolate. The product had an excellent color and resembled meat and produced an acceptably high rate.

EXAMPLE 4

Example 1 was repeated except the soy flour was replaced by soy protein concentrate. The product had excellent color and resembled meat in texture and appearance.

EXAMPLE 5

Example 1 was repeated except the corn oil was replaced with one-half part by weight calcium stearate. The product had excellent color and texture and resembled meat in appearance.

EXAMPLE 6

Example 1 was repeated except the corn oil was replaced with 1 part by weight glycerol. The product had excellent color and resembled meat in color and texture.

EXAMPLE 7

Example 1 was repeated except the corn oil was replaced with one-half part by weight sodium stearoyl-2-lactylate. The product had excellent color and resembled meat in texture and appearance.

EXAMPLE 8

Example 1 was repeated except the corn oil was replaced with 10 parts by weight full fat soy flour (containing 18 percent by weight soybean oil). The product had an excellent color and resembled meat in color and texture.

EXAMPLE 9

Example 1 was repeated except the live steam was injected into the puffing gun at a pressure of about 250 psi for a time of about 17 seconds. Again, the color and texture of the product so produced was excellent.

In each of the examples produced herein, the product of this invention was free of "burned" color and taste and was far superior to any products produced by other methods. The product produced by use of the annular cavity or cylindrical shape with cooling was superior to that heretofore known. This process has resulted in a new and unique product having unusually good properties and being unusually efficient in production.

Having fully described this new and unique invention, the invention is hereby claimed as follows:

1. In a process for preparing puffed food products simulating meat, said process comprising:
   a. mixing a material comprising at least 30 percent by weight protein with water sufficient to provide a moisture content after conversion to a plastic condition and extrusion without puffing of from about 15 percent to about 40 percent by weight;
   b. subjecting the mixture of material and water to shear sufficient to convert it into a plastic condition;
   c. extruding the plastic mixture in a uniform linear flow as an extrudate into a medium of lower pressure without puffing;
   d. placing the extrudate in a confined space;
   e. subjecting the extrudate to a temperature of at least 212°F. and superatmospheric pressure; and
   f. suddenly releasing the pressure on the extrudate to cause it to puff and resemble simulated meat; the improvement in the extruding of the plastic mixture in a uniform linear flow comprising: after extruding the plastic mixture into a medium of lower pressure without puffing and before placing the extrudate in the confined space and while maintaining the mixture in a plastic condition, forming the mixture into an annular shape, cooling both the interior and exterior of the annular form, further extruding the cooled plastic mixture in the annular form, and thereafter subdividing the cooled annular form.

2. A process as in claim 1 wherein the proteinaceous mixture also has added thereto from about ½ percent to about 3 percent by weight of an edible oil or oil-like material prior to subjection of the proteinaceous mixture to conditions sufficient to convert it to a flowable substance.

3. A process as in claim 1 wherein the proteinaceous mixture also has added thereto is from ½ to 3 percent by weight of a material comprising a member selected from the group consisting of vegetable oil, coconut oil, animal oil or fat, oil bearing cereals, oil bearing grains, mineral oil, food grade stearates and polylactic acid esters of fatty acids.

4. A process as in claim 1 wherein the material comprising at least 30 percent by weight protein comprises a member selected from the group consisting of oil seed vegetable protein, casein, caseinate salt, gelatin, microbiological protein, egg white, muscle protein, keratins, lactalbumen and blood.

5. A process as in claim 1 wherein the proteinaceous mixture has the pH adjusted to from 4.5 to 10.5 prior to addition to water.

6. A process as in claim 1 wherein the material comprising at least 30 percent by weight protein comprises a member selected from the group consisting of soy flour, soy protein, soy protein concentrates and soy protein isolates.

7. In a process for preparing puffed food products simulating meat, said process comprising:
  a. mixing a material comprising at least 30 percent by weight protein with water sufficient to provide a moisture content after conversion to a plastic condition and extrusion without puffing of from about 15 percent to about 40 percent by weight;
  b. subjecting the mixture to superatmospheric pressure sufficient to convert it into a plastic condition;
  c. extruding the plastic mixture in a uniform linear flow as an extrudate into a medium of lower pressure without puffing;
  d. placing the extrudate in a confined space;
  e. subjecting the extrudate to a temperature of at least 212°F. and superatmospheric pressure; and
  f. suddenly releasing the pressure on the extrudate to cause it to puff and resemble simulated meat; the improvement in the extruding of the plastic mixture in a uniform linear flow comprising: after extruding the plastic mixture into a medium of lower pressure without puffing and before placing the extrudate in the confined space and while maintaining the mixture in a plastic condition, forming the mixture into an annular shape, cooling both the interior and exterior of the annular form, further extruding the cooled, plastic mixture in the annular form, and thereafter subdividing the cooled annular form.

8. In a process for preparing puffed food products simulating meat, said process comprising:
  a. mixing a material comprising at least 30 percent by weight protein with water sufficient to provide a moisture content after conversion to a plastic condition and extrusion without puffing of from about 15 percent to about 40 percent by weight;
  b. subjecting the mixture to a temperature sufficiently elevated to convert it into a plastic condition;
  c. extruding the plastic mixture in a uniform linear flow as an extrudate into a medium of lower pressure without puffing;
  d. placing the extrudate in a confined space;
  e. subjecting the extrudate to a temperature of at least 212°F. and superatmospheric pressure; and
  f. suddenly releasing the pressure on the extrudate to cause it to puff and resemble simulated meat; the improvement in the extruding of the plastic mixture in a uniform linear flow comprising: after extruding the plastic mixture into a medium of lower pressure without puffing and before placing the extrudate in the confined space and while maintaining the mixture in a plastic condition, forming the mixture into an annular shape, cooling both the interior and exterior of the annular form, further extruding the cooled, plastic mixture in the annular form, and thereafter subdividing the cooled annular form.

* * * * *